United States Patent [19]

Goade

[11] Patent Number: 5,528,977
[45] Date of Patent: Jun. 25, 1996

[54] RETENTION MECHANISM FOR A CAGE OF A SWASHPLATE BEARING

[75] Inventor: James C. Goade, Shorewood, Ill.

[73] Assignee: Caterpillar Inc., Peoria, Ill.

[21] Appl. No.: 395,342

[22] Filed: Feb. 28, 1995

[51] Int. Cl.⁶ .................. F01B 3/00; F04B 1/12; F04B 27/08
[52] U.S. Cl. .................. 92/71; 91/505; 417/269
[58] Field of Search .................. 92/12.2, 71, 70; 91/505, 506; 417/269, 222.1, 218

[56] References Cited

U.S. PATENT DOCUMENTS

| | | | |
|---|---|---|---|
| 4,029,367 | 6/1977 | Schwede et al. | 92/12.2 X |
| 4,627,330 | 12/1986 | Beck, Jr. | 92/12.2 |
| 4,856,917 | 8/1989 | Schroder et al. | 92/12.2 X |
| 4,858,480 | 8/1989 | Rohde et al. | 92/12.2 X |
| 5,024,143 | 6/1991 | Schniederjan | 92/71 X |
| 5,383,391 | 1/1959 | Goade et al. | 92/12.2 |
| 5,390,584 | 2/1995 | Fritz et al. | 92/12.2 |
| 5,406,878 | 4/1995 | Freeman et al. | 92/12.2 |

FOREIGN PATENT DOCUMENTS

| | | | |
|---|---|---|---|
| 2353747 | 12/1977 | France . | |
| 2647139 | 4/1978 | Germany | 91/505 |
| 3000921 | 7/1981 | Germany | 91/505 |
| 3442391 | 1/1986 | Germany | 91/505 |
| 3610914 | 1/1987 | Germany | 91/505 |
| 3737389 | 5/1989 | Germany | 91/506 |
| 60-30484 | 2/1985 | Japan | 91/505 |
| 823626 | 4/1981 | Russian Federation | 91/505 |
| 1652647 | 5/1991 | Russian Federation | 417/269 |

*Primary Examiner*—John E. Riznic
*Attorney, Agent, or Firm*—John W. Grant

[57] ABSTRACT

A flexible retention mechanism for maintaining a positional relationship between a bearing cage of an arcuate roller bearing assembly and a swashplate supported by the bearing assembly includes a flexible retainer connected to the bearing cage and having a pair of end portions resiliently engaging a pair of anchor pins extending outwardly from the swashplate.

4 Claims, 1 Drawing Sheet

RETENTION MECHANISM FOR A CAGE OF A SWASHPLATE BEARING

TECHNICAL FIELD

This invention relates generally to a hydraulic axial cylinder device and more particularly to a retention mechanism for maintaining synchronization between a tiltable swashplate and a bearing cage of a roller bearing supporting the swashplate.

BACKGROUND ART

Axial piston variable displacement hydraulic units utilize a tiltable swashplate to control the displacement of pistons within a rotating cylinder block. One common type of tiltable swashplate is a cradle type swashplate which is supported at one end of the housing by a pair of arcuate bearings having rolling elements. Each of the pair of roller bearings is provided with a bearing cage locating the individual rolling elements of the bearing. Roller bearing geometries require the arcuate displacement of the bearing cage be in direct proportion to the arcuate displacement of the cradle swashplate in order to obtain an exclusively rolling motion of the rolling elements. Furthermore, since the roller bearings are segmental, repeated tilting of the swashplate can lead to slipping of the roller elements between the housing and the cradle swashplate to positions other than the desired optimum support positions for resisting the axial thrust of the swashplate.

In order to assure that the arcuate roller bearings do not slip to an adverse position, some of the axial piston hydraulic units have a timing or locating arrangement in the form of elongate rods or links extending between the swashplate and the housing and being connected to the cage of the cradle bearing.

One of the problems encountered with those link type locating devices is that the links either have transversely extending projections extending into mating bores in the swashplate and housing or have openings that slide onto pivot pins extending transversely from the swashplate in the housing. In both cases, the links are installed after the swashplate is installed thereby requiring an access opening provided in the side of the housing. The opening then must be covered by a removable cover with some type of seal or gasket between the housing and the cover. Providing the access unit opening, the cover and the seal adds to the cost of the unit. Moreover, the access opening provides a potential leakage path from the interior of the unit housing.

In view of the above, it would be desirable to have a simple, flexible retention mechanism which maintains synchronization between a tiltable swashplate and a bearing cage of a roller bearing supporting the swashplate, eliminates the need for an access opening in the housing, and allows blind assembly of the swashplate within the housing. Eliminating the side access openings in the housing and thus the covers therefore reduces the number of potential leak paths from the interior of the housing. Allowing blind assembly of the swashplate within the housing simplifies the assembly process.

DISCLOSURE OF THE INVENTION

In one aspect of the present invention, an axial piston hydraulic device has a housing defining at least one concave arcuate surface in the housing, a swashplate positioned in the housing and having at least one arcuate convex surface, and an arcuate roller bearing positioned between the convex and concave surfaces and having an arcuate bearing cage. The device also includes a pair of anchor pins extending from the swashplate and a flexible retainer having an arcuate section concentric with the bearing cage and a pair of end portions attached to the bearing cage and resiliently engaging the anchor pins.

BEST MODE FOR CARRYING OUT THE INVENTION

Figure 1:
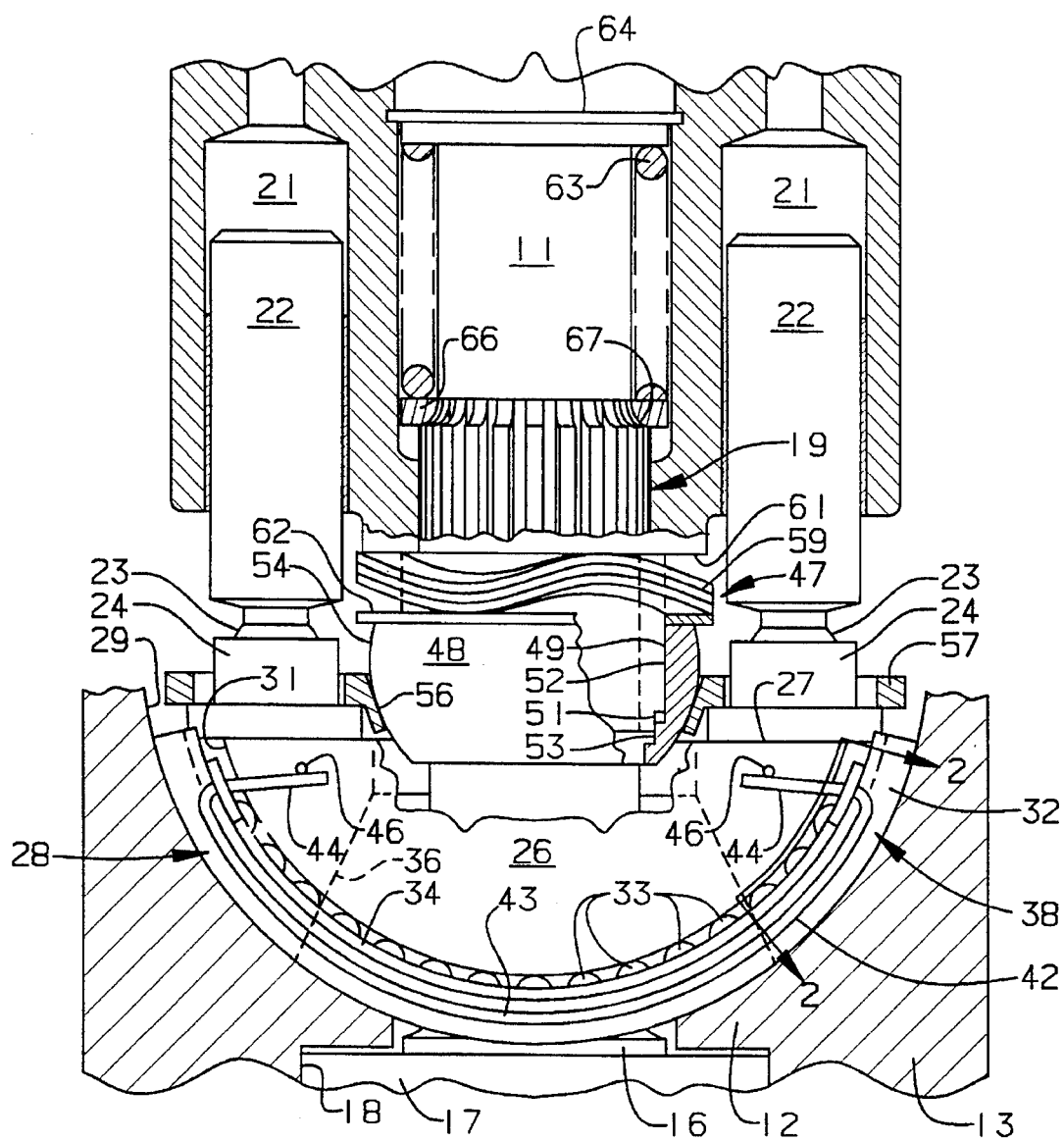
FIG. 1 is a sectional view of a hydraulic unit utilizing the present invention.
Figure 2:
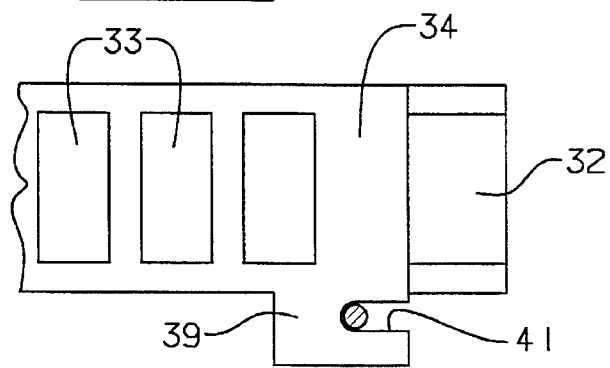
FIG. 2 is a partial sectional view taken generally along lines 2—2 of FIG. 1.

A hydraulic device 10 of the axial piston variable displacement type may be adapted to function either as a pump or a motor as is well understood in the art. To facilitate description, the device 11 will be herein referred to as a pump and described with reference to this mode of operation, it being apparent that the invention is equally applicable to motors of the variable displacement, axial piston form.

The pump 10 has a rotary drive shaft 11 which extends through one end wall 12 of a housing partially shown at 13 to support and drive an annular cylinder barrel 14. The drive shaft 11 may be coupled to a driving engine in any suitable known manner and has a flange 16 abutting a bearing 17 seated in a bore 18 in the end wall 12. The drive shaft 11 is disposed along a longitudinal axis.

The barrel 14 is disposed within the housing 13 in coaxial relation to the shaft 11 and is coupled thereto by a spline connection 19 for rotation about the axis. The barrel has a plurality of angular spaced cylinder bores 21 which extend parallel to the axis of the barrel. Each of a plurality of cylindrical pistons 22 are disposed in an individual one of the cylinder bores for reciprocation therein and have an end 23 protruding from the barrel. A plurality of slippers 24 are individually swivably connected to the protruding ends of the pistons in the usual manner.

A cradle swashplate 26 is positioned within the housing and is adapted for tilting or pivotable movement induced by an input mechanism (not shown). The swashplate has a planar cam surface 27 facing the barrel 14 and engaged by the slippers 23 so that the tilting movement of the swashplate controls the axial displacement of the pistons.

The cradle swashplate 26 is mounted in the housing by a pair of roller bearing assembly one of which is shown at 28 positioned between an arcuate concave surface 29 provided in the housing and an arcuate convex surface 31 on the swashplate. Each of the roller bearing assemblies includes an outer race 32 seated in the concave surface 29 and a plurality of rollable elements such as rollers 33 and a bearing cage 34 to maintain arcuate spacing between the individual rollers 33. The swashplate 26 is provided with a central opening 36 which permits passage of the shaft through the center of the swashplate.

A flexible retention mechanism 38 includes a pair of tabs 39 extending laterally from the bearing cage 34 with each tab having an opening therein in the form of an elongate slot 41. A flexible retainer 42 has an arcuate central section 43 concentric with the bearing cage 34 and a pair of inwardly extending end portions 44 passing through the slots 41 for attaching the retainer to the bearing cage. The end portions 44 resiliently engage a pair of anchor pins 46 extending outwardly from the swashplate. The spring is preferably made from a spring material such as spring steel or the like.

A resilient holddown device 47 is provided to maintain the slippers 24 in contact with the cam surface 27 and includes an annular holddown sleeve 48 having a pair of concentric bores 49,51 slidably disposed on matching cylindrical surfaces 52,53, respectively. The sleeve is coaxially disposed around the drive shaft and has a spherical shaped outer surface 54 in engagement with an inner annular surface 56 of a annular holddown plate 57. The holddown plate 57 extends radially outwardly to overlap each of the slippers 24. The inner surface 56 in this embodiment is a frustoconical shaped surface.

A nested wave spring 59 is disposed between an annular shoulder 61 on the barrel 14 and an annular washer 62 in abutment with the holddown sleeve 48 to resiliently urge the sleeve away from the barrel to hold the slipper pads against the cam surface.

A coil spring 63 is disposed coaxially around the drive shaft 11 within the barrel 14 and acts between a snap ring 64 engaged in the barrel and a retainer ring 66 seated on an annular shoulder 67 provided at the ends of the spline formed on the drive shaft.

Industrial Applicability

In use, the flexible retention mechanism 38 is assembled into the hydraulic device 10 in the following manner. The flexible retainer 42 is initially connected to the bearing cage 34 by inserting the end portions 44 through the slots 41 in the tabs 39. The assembled retainer, cage, and roller elements are then placed on the outer race 32 that has been previously positioned and positively located within the housing 13. The swashplate 26 is then lowered into the housing with the swashplate being maintained at an equivalent to its centered or neutral operating position so that the anchor pins 46 engage the end portions 44 of the flexible retainer. Engagement between the anchor pins and the end portions tends to center the bearing cage and thus the roller bearing.

During operation of the assembled hydraulic unit, pivotable movement of the swashplate from its neutral position shown causes one of the end portions to be further compressed while the other end portion relaxes somewhat but remains in engagement with its respectively anchor pin. This action maintains proper alignment between the bearing cage and the swashplate.

In view of the above, it is readily apparent that the structure of the present invention provides a flexible retainer mechanism for maintaining a relationship between a bearing cage of roller bearing assembly and a swashplate supported by the roller bearing assembly that is simple in construction, allows blind assembly of the swashplate into the housing, and eliminates the need for side access holes in the housing, the covers therefore and the potential leak paths. The above is accomplished by providing a flexible retainer connected to the bearing cage and having end portions resiliently engagable with the anchor pins extending from the swashplate.

Other aspects, objects, and advantages of this invention can be obtained from a study of the drawings,.the disclosure, and the appended claims.

I claim:

1. An axial piston variable displacement hydraulic device having a housing defining at least one concave arcuate surface, a swashplate positioned in the housing and having at least one arcuate convex surface, and an arcuate roller bearing assembly positioned between the convex and concave surfaces and having an arcuate bearing cage comprising:
    a pair of anchor pins extending from the swashplate; and
    a flexible retainer having an arcuate center section concentric with the bearing cage and a pair of end portions attached to the bearing cage and resiliently engaging the anchor pins.

2. The hydraulic device of claim 1, wherein the cage has a pair of laterally extending tabs engaged by the end portions.

3. The hydraulic device of claim 2, wherein each tab includes an opening therein with the end portions extending through the openings.

4. The hydraulic device of claim 3, wherein the openings are elongate slots.

\* \* \* \* \*